(12) United States Patent
Gastellu

(10) Patent No.: US 9,499,075 B1
(45) Date of Patent: Nov. 22, 2016

(54) CHILD CAR SEAT NECK AND HEAD SUPPORT SYSTEM

(71) Applicant: Myriam C. Gastellu, Wharton, NJ (US)

(72) Inventor: Myriam C. Gastellu, Wharton, NJ (US)

( * ) Notice: Subject to any disclaimer, the term of this patent is extended or adjusted under 35 U.S.C. 154(b) by 61 days.

(21) Appl. No.: 14/089,866

(22) Filed: Nov. 26, 2013

(51) Int. Cl.
A47C 7/38 (2006.01)
B60N 2/28 (2006.01)

(52) U.S. Cl.
CPC ........... *B60N 2/2851* (2013.01); *B60N 2/2806* (2013.01); *B60N 2/2872* (2013.01)

(58) Field of Classification Search
CPC B60N 2/2806; B60N 2/2872; B60N 2/2851; B60N 2/2884; B60N 2/286
USPC ..................... 297/219.12, 392, 393, 397, 410
See application file for complete search history.

(56) References Cited

U.S. PATENT DOCUMENTS

| | | | |
|---|---|---|---|
| 4,383,713 A * | 5/1983 | Roston | 297/397 X |
| 4,402,548 A * | 9/1983 | Mason | 297/464 |
| 4,565,405 A * | 1/1986 | Mayer | 297/397 X |
| 5,161,522 A * | 11/1992 | Clevenger | 297/410 X |
| D335,418 S | 5/1993 | Bowes et al. | |
| 5,310,245 A * | 5/1994 | Lyszczasz | 297/397 X |
| 5,339,472 A | 8/1994 | Yin | |
| 5,383,711 A * | 1/1995 | Houghteling | 297/397 |
| 5,505,523 A * | 4/1996 | Wang | 297/393 |
| 5,669,665 A * | 9/1997 | Nowak | 297/397 X |
| 5,735,576 A | 4/1998 | Pepys et al. | |
| 6,139,100 A * | 10/2000 | Baskin-Lockman et al. | 297/397 X |
| 6,266,832 B1 | 7/2001 | Ezell | |
| 6,386,639 B1 * | 5/2002 | McMichael | 297/393 X |
| 6,523,901 B2 | 2/2003 | Smith | |
| 6,644,747 B2 * | 11/2003 | Jones | 297/397 X |
| 6,758,526 B2 | 7/2004 | Marbutt | |
| 6,845,534 B1 * | 1/2005 | Huang | 297/393 X |
| 6,951,367 B1 * | 10/2005 | Dinnan | 297/397 X |
| 7,490,909 B1 | 2/2009 | Haggman et al. | |
| 7,530,634 B1 * | 5/2009 | Mortazavi et al. | 297/393 X |
| 2010/0237675 A1* | 9/2010 | Merritt | 297/393 |
| 2013/0088063 A1* | 4/2013 | Montes | 297/393 |

* cited by examiner

Primary Examiner — Rodney B White

(57) ABSTRACT

A child safety assembly for restraining a child's head in a car seat includes a cushion that may be positioned between a child's head and a car seat so the cushion restrains the child's head.

1 Claim, 3 Drawing Sheets

CHILD CAR SEAT NECK AND HEAD SUPPORT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of child car seats, more specifically, a neck and head support system to further restrict motion of the neck and head of an infant while riding in a child car seat.

SUMMARY OF THE INVENTION

An embodiment of the disclosure meets the needs presented above by generally comprising a cushion that may be positioned between a child's head and a car seat so the cushion restrains the child's head.

These together with additional objects, features and advantages of the child car seat neck and head support system will be readily apparent to those of ordinary skill in the art upon reading the following detailed description of presently child car seat neck and head support system when taken in conjunction with the accompanying drawings.

In this respect, before explaining the current embodiments of the child car seat neck and head support system in detail, it is to be understood that the child car seat neck and head support system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child car seat neck and head support system.

It is therefore important that the claims be regarded as including such equivalent construction insofar as they do not depart from the spirit and scope of the child car seat neck and head support system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
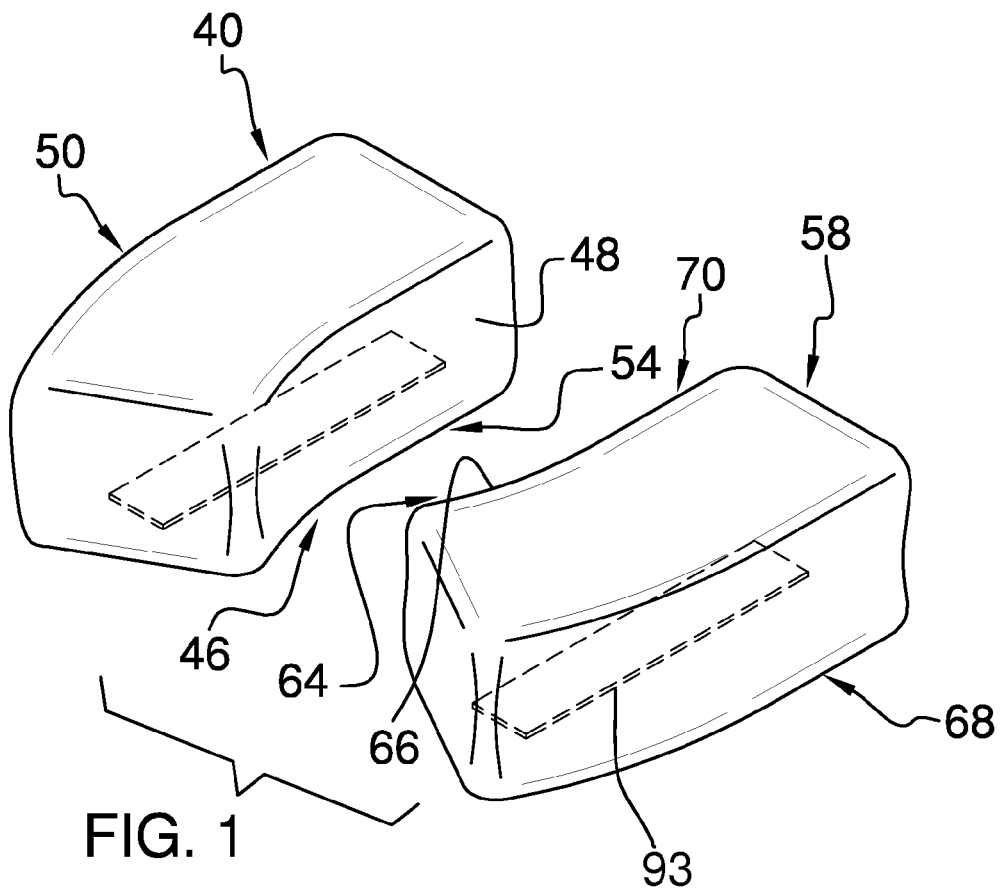
FIG. 1 is a top perspective view of a child safety assembly according to an embodiment of the disclosure.
Figure 2:
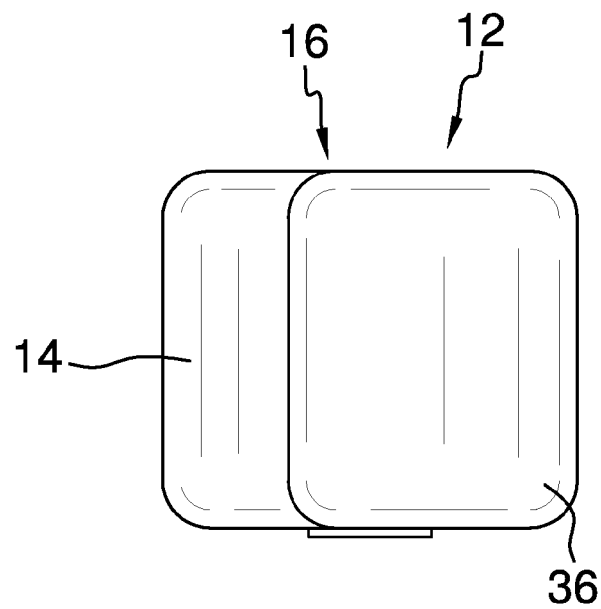
FIG. 2 is a front view of an embodiment of the disclosure.
Figure 3:
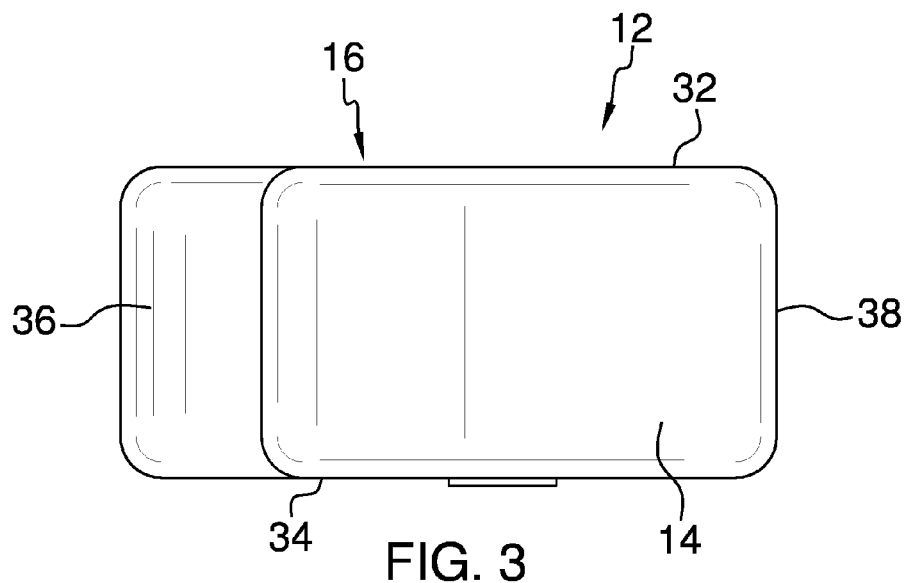
FIG. 3 is a right side view of an embodiment of the disclosure.
Figure 4:
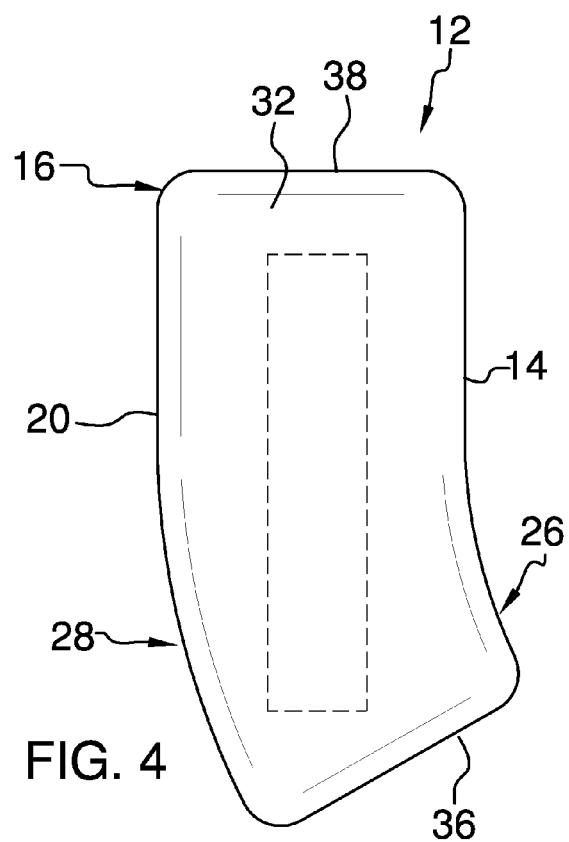
FIG. 4 is a top view of an embodiment of the disclosure.
Figure 5:
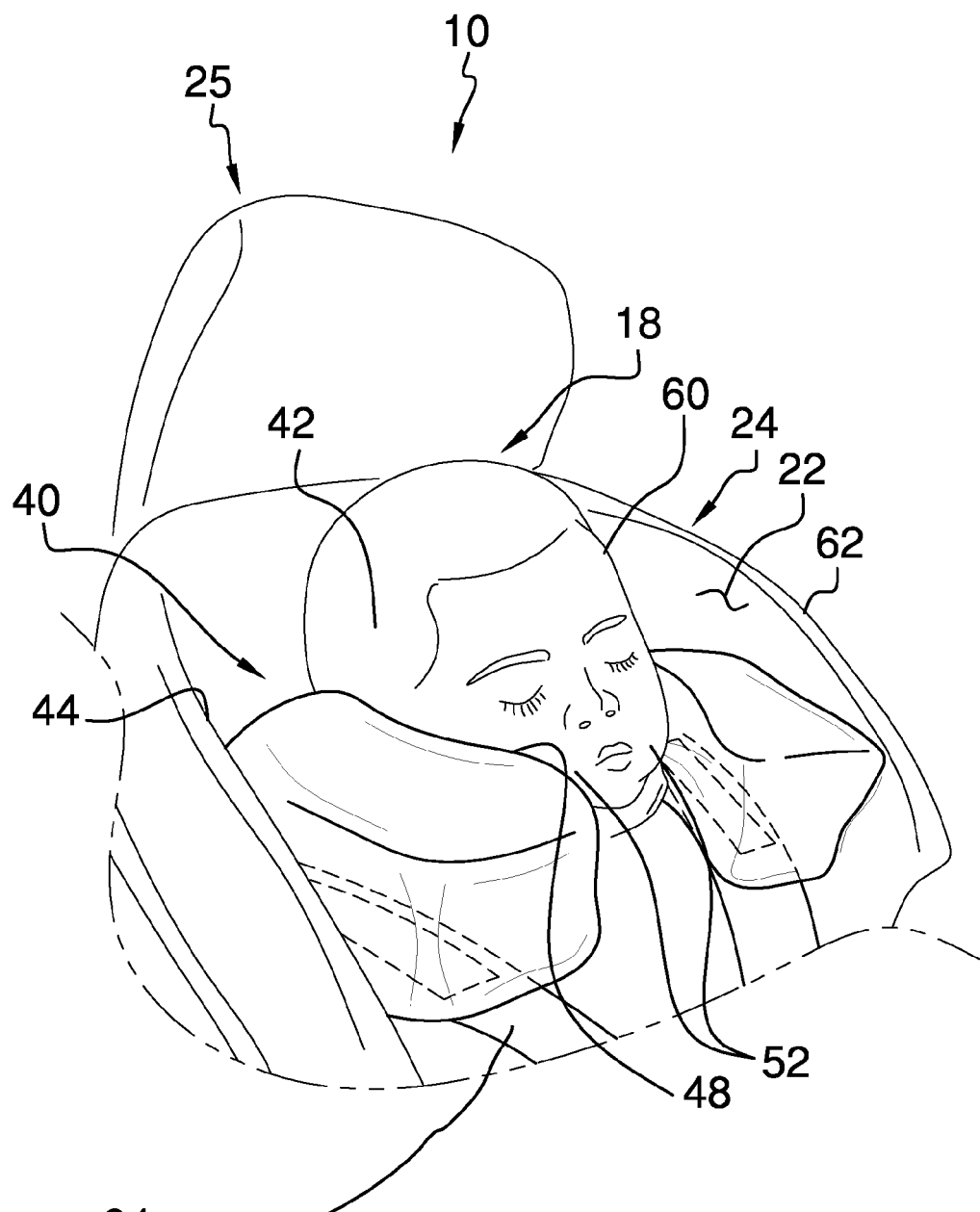
FIG. 5 is an in-use view of an embodiment of the disclosure.

As best illustrated in FIGS. 1 through 5, the child safety assembly 10 (hereinafter assembly) generally comprises a cushion 12 that has a rectangular parallelepiped shape. The cushion 12 is positionable so a first lateral side 14 of an outer wall 16 of the cushion 12 abuts the child's head 18. Further, a second lateral side 20 of the outer wall 16 of the cushion 12 abuts an inside surface 22 of a top portion 24 of a car seat 25. The cushion 12 may be comprised of a resiliently compressible material. Lastly, the cushion 12 may have a length between 20 cm and 25 cm, and width and height between 7 cm and 10 cm.

A front portion 26 of the first lateral side 14 of the outer wall 16 of the cushion 12 is concavely curvilinear with respect to a front portion 28 of the second lateral side 20 of the outer wall 16 of the cushion 12. The cushion 12 has a J-shaped cross section taken along a longitudinal axis extending through a top side 32 and a bottom side 34 of the outer wall 16 of the cushion 12. Moreover, a front side 36 of the outer wall 16 of the cushion 12 forms an acute inside angle with respect to a back side 38 of the outer wall 16 of the cushion 12.

The cushion 12 is one of a pair of cushions 12. A first one of the pair of cushions 40 is positionable between a first lateral side 42 of the child's head 18 and a first lateral side 44 of the inside surface 22 of the top portion 24 of the car seat 25. Continuing, the first cushion 40 is further positionable so a front portion 46 of a first lateral side 48 of an outer wall 50 of the first cushion 40 abuts an associated one of the child's cheeks 52. A rear portion 54 of the first lateral side 48 of the outer wall 50 of the first cushion 40 abuts the first lateral side 42 of the child's head 18. Lastly, the first cushion 40 prevents the child's head 18 from moving toward the first lateral side 44 of the inside surface 22 of the top portion 24 of the car seat 25.

A second one of the pair of cushions 58 is positionable between a second lateral side 60 of the child's head 18 and a second lateral side 62 of the inside surface 22 of the top portion 24 of the car seat 25. Additionally, the second cushion 58 is further positionable so a front portion 64 of a first lateral side 66 of an outer wall 68 of the second cushion 58 abuts an associated one of the child's cheeks 52. A rear portion 70 of the first lateral side 66 of the outer wall 68 of the second cushion 58 abuts the second lateral side 60 of the child's head 18. Finally, the second cushion 58 prevents the child's head 18 from moving toward the second lateral side 62 of the inside surface 22 of the top portion 24 of the car seat 25. Each of the first 40 and second 58 cushions may prevent the child's head 18 from moving laterally if the car seat 25 is exposed to excessive lateral force. The first 40 and second 58 cushions additionally minimize the risk of injury to the child's neck 74.

In use, each of the first 40 and second 58 cushions are positioned between the child's head 18 and each of the first 44 and second 62 lateral sides of the inside surface 22 of the top portion 24 of the car seat 25. Additionally, the first 40 and second 58 cushions are used to keep the child's head 18 upright when the child sleeps in the car seat 25. The first 40 and second 58 cushions may be utilized together or independently.

It shall be noted that nylon hook or loop strips 93 are provided on the bottom side 34 in order to secure the assembly 10 to a car seat shoulder belt 94.

With respect to the above description, it is to be realized that the optimum dimensional relationship for the various components of the assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A child safety assembly for restraining a child's head in a car seat comprising:

a cushion having a rectangular parallelepiped shape wherein a first lateral side of an outer wall of said cushion abuts the child's head and a second lateral side of said outer wall of said cushion abuts an inside surface of a top portion of the car seat;

a front portion of said first lateral side of said outer wall of said cushion being concavely curvilinear with respect to a front portion of a second lateral side of said outer wall of said cushion wherein said cushion has a J-shaped cross section taken along a longitudinal axis extending through a top side and a bottom side of said outer wall of said cushion;

said cushion being one of a pair of said cushions;

a first one of said pair of cushions being positionable between a first lateral side of the child's head and a first lateral side of the inside surface of the top portion of the car seat, said first cushion being further positionable wherein a front portion of said first lateral side of an outer wall of said first cushion abuts an associated one of the child's cheeks wherein a rear portion of said first lateral side of said outer wall of said first cushion abuts a first lateral side of the child's head;

a second one of said pair of cushions being positionable between a second lateral side of the child's head and a second lateral side of the inside surface of the top portion of the car seat, said second cushion being further positionable wherein a front portion of a first lateral side of an outer wall of said second cushion abuts an associated one of the child's cheeks wherein a rear portion of said first lateral side of said outer wall of said second cushion abuts a second lateral side of the child's head; and wherein each of said first and second cushions is configured to prevent the child's head from moving laterally while the child is seated in the car seat;

wherein nylon hook or loop strips are provided on the bottom side in order to secure the assembly to a car seat shoulder belt.

* * * * *